United States Patent [19]

Kin

[11] Patent Number: 5,081,762
[45] Date of Patent: Jan. 21, 1992

[54] TOOL EXCHANGE DEVICE FOR A MACHINE TOOL

[75] Inventor: Narihiko Kin, Nagoya, Japan

[73] Assignee: Brother Kogyo Kabushiki Kaisha, Nagoya, Japan

[21] Appl. No.: 577,333

[22] Filed: Sep. 4, 1990

[30] Foreign Application Priority Data

Sep. 1, 1989 [JP] Japan .................................. 1-227867
Sep. 1, 1989 [JP] Japan .................................. 1-227868

[51] Int. Cl.⁵ ............................................. B23Q 3/157
[52] U.S. Cl. ................................................... 29/568
[58] Field of Search ....................... 29/568; 294/116; 414/736, 739

[56] References Cited

U.S. PATENT DOCUMENTS 3,845,546 11/1974 Rutschke ........................ 294/116 X
4,817,267 4/1989 Hitomi .................................. 29/568
4,833,772 5/1989 Kobayashi et al. .................. 29/568

FOREIGN PATENT DOCUMENTS 63-123646 5/1988 Japan .
228749 9/1989 Japan ..................................... 29/568

Primary Examiner—Steven C. Bishop
Attorney, Agent, or Firm—Oliff & Berridge

[57] ABSTRACT

A tool exchange arm comprising a rotatable tool exchange arm body, and multiple sets of two fingers with claws mounted to the tool exchange arm for exchanging tools on a spindle and in a tool magazine of a machine tool, and a mechanism for driving the tool exchange arm comprising an actuator for opening and closing the fingers, a hollow shaft connected to the tool exchange arm for reciprocating and rotating the tool exchange arm along and about an axis, a central shaft extending through the hollow shaft for engaging and actuating the actuator, and a rotating member rotatably mounted to a housing and coupled to the central shaft. The tool exchange arm is simple in structure, and consists of a small number of components. The movement of the fingers are securely controlled. The mechanism for driving the tool exchange arm is also compact in size.

36 Claims, 8 Drawing Sheets

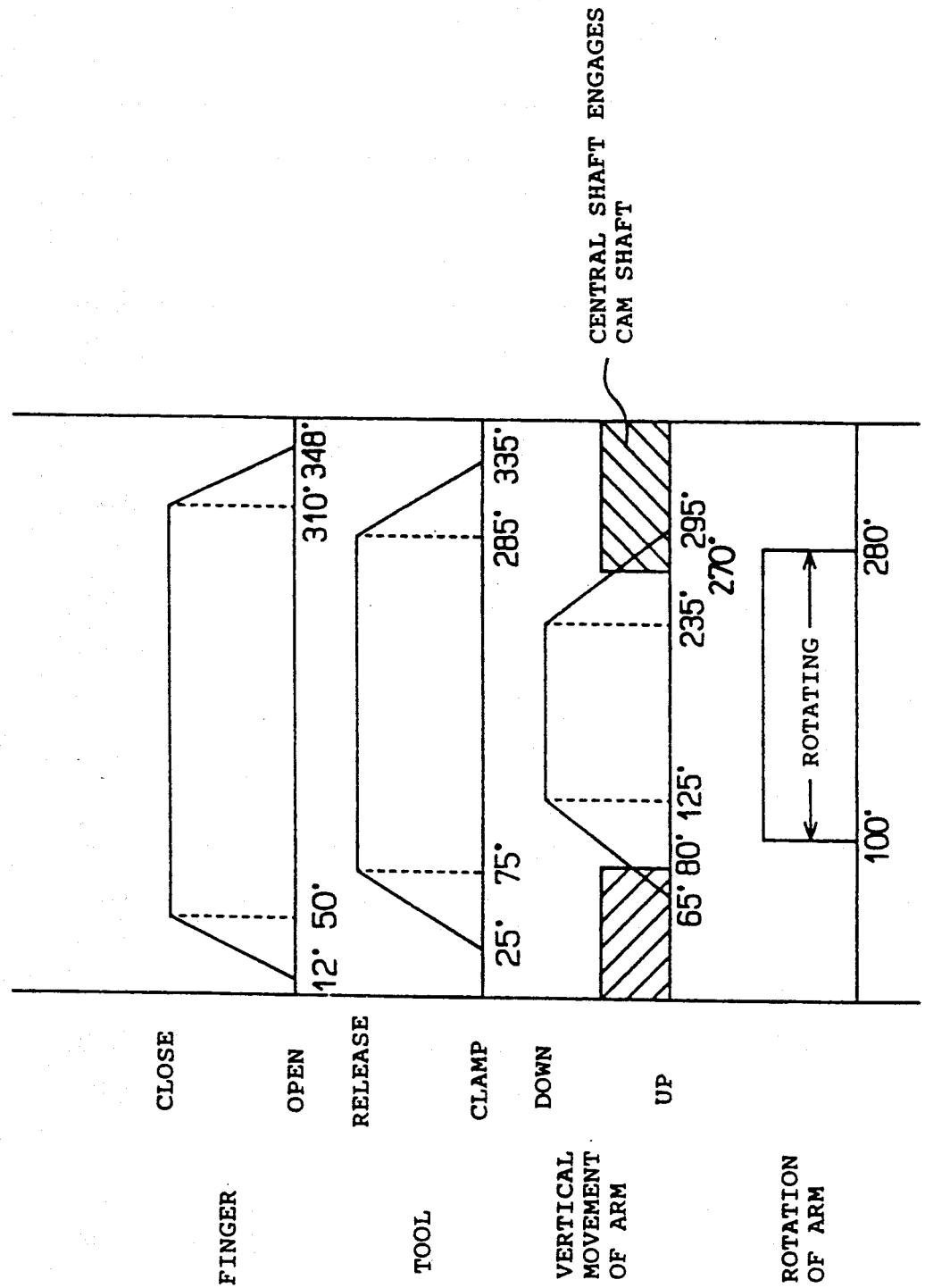

FIG. 9
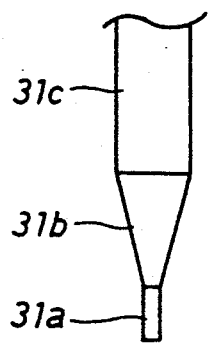
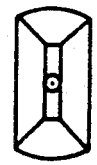

TOOL EXCHANGE DEVICE FOR A MACHINE TOOL

BACKGROUND OF THE INVENTION

The present invention relates to a tool device, comprising an exchange arm and a driving mechanism therefore, for a machining tool. Such machining tools exchange a tool on a spindle of a machine tool with a tool in a tool magazine.

Known machine tools can exchange a tool on a spindle with a tool in a tool magazine by a tool exchange arm. The body of the tool exchange arm is provided with sets of fingers which grip the tools on the spindle and in the tool magazine. By rotating the tool exchange arm, the fingers are rotated to exchange the tools.

Such tool exchange arm is proposed in Japanese Published Unexamined Application No. S63-123646, which uses a linkage. A rack is moved back and forth by rotating a pinion. A lever follows the movement of the rack to open and close gripping claws. Another tool exchange arm uses a hydraulic cylinder or the like to open and close the gripping claws.

These tool exchange arms have the following disadvantages. First, the tool exchange arms consist of a large number of components because of the linkage or hydraulic cylinder and thus are complex in structure. In addition, members connected directly or indirectly to the gripping claws are provided interlocking mechanisms or the like for controlling the fingers.

In the tool exchange arms using the linkage, the linkage has numerous pivots, and backlash tends to occur at the pivots. As a result, the movement of the fingers may not be correctly controlled, and the tool cannot be accurately gripped or set on the spindle or tool magazine.

In the structure described in Japanese Published Unexamined Patent Application No. S63-123646, the rack and the pinion compose an actuator for opening and closing the fingers. The actuator is driven to close the fingers for gripping the tool mounted on the spindle and the tool held in the tool magazine, respectively. Subsequently, the tool exchange arm is rotated about the axis of the body of the tool exchange arm, thereby exchanging the tool on the spindle with the tool in the tool magazine.

The tool exchange arm is rotated by rotating a hollow shaft mounted to the body of the tool exchange arm. A central shaft extends through the hollow shaft and rotates independently of the hollow shaft. The central shaft actuates the actuator for driving the fingers.

Since the tool exchange arm is provided with a drive mechanism including the hollow shaft and the central shaft, the size of the entire machine tool increases for the following two reasons: (1) a drive member for rotating the central shaft is installed outside the end of the central shaft at the opposite side of the tool exchange arm. The size of the central shaft increases in the direction of the central shaft, corresponding to the shape of the drive member; and (2) a member for supporting the hollow shaft is needed separately from a member for supporting the central shaft.

SUMMARY OF THE INVENTION

An object of the invention is to provide a tool exchange arm that is simple in structure consisting of a small number of components and that can precisely control movement of sets of fingers.

Another object of the invention is to provide a small mechanism for driving the tool exchange arm of a machine tool to permit a reduction in the size of the machine tool.

A tool exchange arm according to the invention includes a tool exchange arm body rotatable about an axis, and multiple sets of two fingers mounted to the tool exchange arm body for gripping a tool on a spindle of a machine tool and a tool in a tool magazine, respectively, by opening and closing. When the fingers grip the tools and the tool exchange arm body is rotated, the tools are exchanged. The sets of fingers are mounted to the tool exchange arm body so as to be rotatable about an axis parallel to the axis about which the tool exchange arm body rotates. The fingers have claws at their front ends. The fingers are provided with actuating means for actuating the claws toward or away from each other. A cam for driving the fingers rotates a given angle forward or in reverse about the axis about which the tool exchange arm body rotates. One of the fingers of each set has a cam follower position on which the cam acts. The cam follower portions rotate to open or close the fingers against the force of the actuating means. The other finger of each set has an engaging portion which engages with the finger having the cam follower position, thereby rotating the other finger.

In the above-mentioned structure, if the actuating means actuates the sets of fingers in one direction such that the claws at the front end of the fingers close, the cam for driving the fingers is rotated the given angle to act on the cam follower position of one finger of each set and to open the finger against the force of the actuating means. The engaging portion of the other finger of each set engages with the cam follower position, and the other finger rotates. The cam for driving the fingers thus opens the fingers of each set. The tool on the spindle and the tool in the tool magazine can be inserted between the claws of the fingers of each set.

When the cam for driving the fingers is rotated in reverse, the cam follower portion receives no movement of the cam. Therefore, the actuating means closes the fingers of each set. If the tools have been inserted between the fingers, the tools are gripped.

After the tools are gripped, the tool exchange arm body is rotated and moved vertically as required. The tools gripped by the fingers can be set on the spindle and in the magazine, respectively. As aforementioned, the cam for driving the fingers rotates the given angle to open the fingers, thus releasing the tools.

On the other hand, if the actuating means actuates the fingers such that the claws at the front ends of the fingers are spaced apart from each other, the cam can actuate the cam follower portion of one finger of each set to close. In this case, the cam causes the fingers to grip the tools. The tools are released by the actuating means.

According to the invention, a mechanism for driving a tool exchange arm comprises an actuator mounted to a tool exchange arm body for opening and closing sets of fingers for gripping tools, a hollow shaft connected to the tool exchange arm for reciprocating and rotating the tool exchange arm along and about an axis, a central shaft extending through the hollow shaft for engaging and actuating the actuator, and a rotating member rotatably mounted to a housing and coupled to the central shaft. One end of the hollow shaft at the side of the tool exchange arm is supported by the housing, and the other end of the hollow shaft is supported by the inner surface of a hole in the rotating member such that the tool exchange arm can reciprocate and rotate along and about the axis. Between the ends of the hollow shaft, a hollow shaft drive means is mounted for reciprocating and rotating the hollow shaft along and about the axis. A rotating member drive means is provided at one side of the rotating member for rotating the rotating member about the axis and actuating the central shaft.

The hollow shaft is supported by the housing and the inner surface of the rotating member so as to be movable along the axis and rotatable about the axis. The hollow shaft drive means mounted between the two ends of the hollow shaft causes the hollow shaft to move along and rotate about the axis. The tool exchange arm mounted on the hollow shaft reciprocates along the axis and rotates about the axis according to the movement of the hollow shaft, thereby exchanging the tool on the spindle with the tool in the tool magazine.

The hollow shaft, which surrounds the outer periphery of the central shaft of the tool exchange arm, reciprocates along the axis of the central shaft, independently of the central shaft. The central shaft then comes into or out of engagement with the actuator for opening and closing the fingers. When the central shaft engages the actuator, the rotation of the rotating member driven by the rotating member drive means and connected to the central shaft is transmitted to the actuator. The actuator opens or closes the fingers to grip or release the tools on the spindle and in the tool magazine.

The fingers thus grip or release the tools. At the same time, the tool exchange arm reciprocates and rotates along and about the axis. The tool on the spindle is exchanged with the tool in the tool magazine.

The actuator can include a hollow cam shaft with a hollow portion. A guide portion, a sliding portion and an engaging portion can be formed at the front end of the central shaft of the tool exchange arm. The guide portion of the central shaft engages in the hollow portion of the hollow cam shaft. The sliding portion of the central shaft smoothly engages the central shaft and the hollow cam shaft. The central shaft thus surely engages the hollow cam shaft.

BRIEF DESCRIPTION OF THE DRAWINGS

FIG. 7 is a timing chart illustrating the movement of the rotating arm.

FIG. 8 is a cross-sectional view taken on line VIII—VIII of FIG. 2.

FIG. 9 is a schematic view of the front end of a central shaft mounted in the rotating arm.

DESCRIPTION OF THE PREFERRED EMBODIMENT

Figure 3:
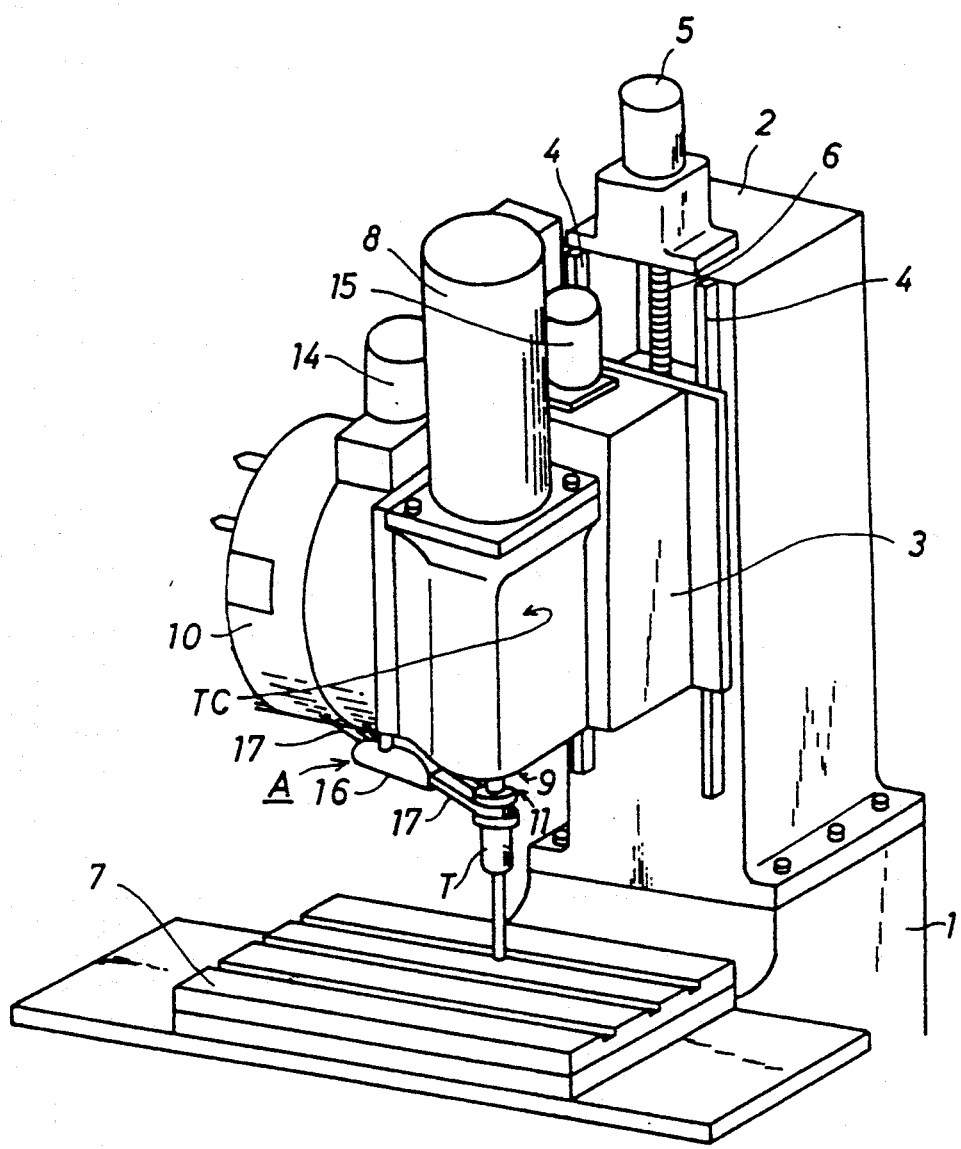
FIG. 3 is a perspective view of a machining center on which the rotating arm is mounted.

As shown in FIG. 3, a machining center includes a base 1, a column 2 fixed on the base 1, and a spindle mount 3 supported on the column 2. The spindle mount 3 is guided by linear guides 4 and moved vertically by a Z-axis motor 5 via a feed screw 6. A table 7 is mounted on the base 1 such that the table 7 can move horizontally.

Figure 4:
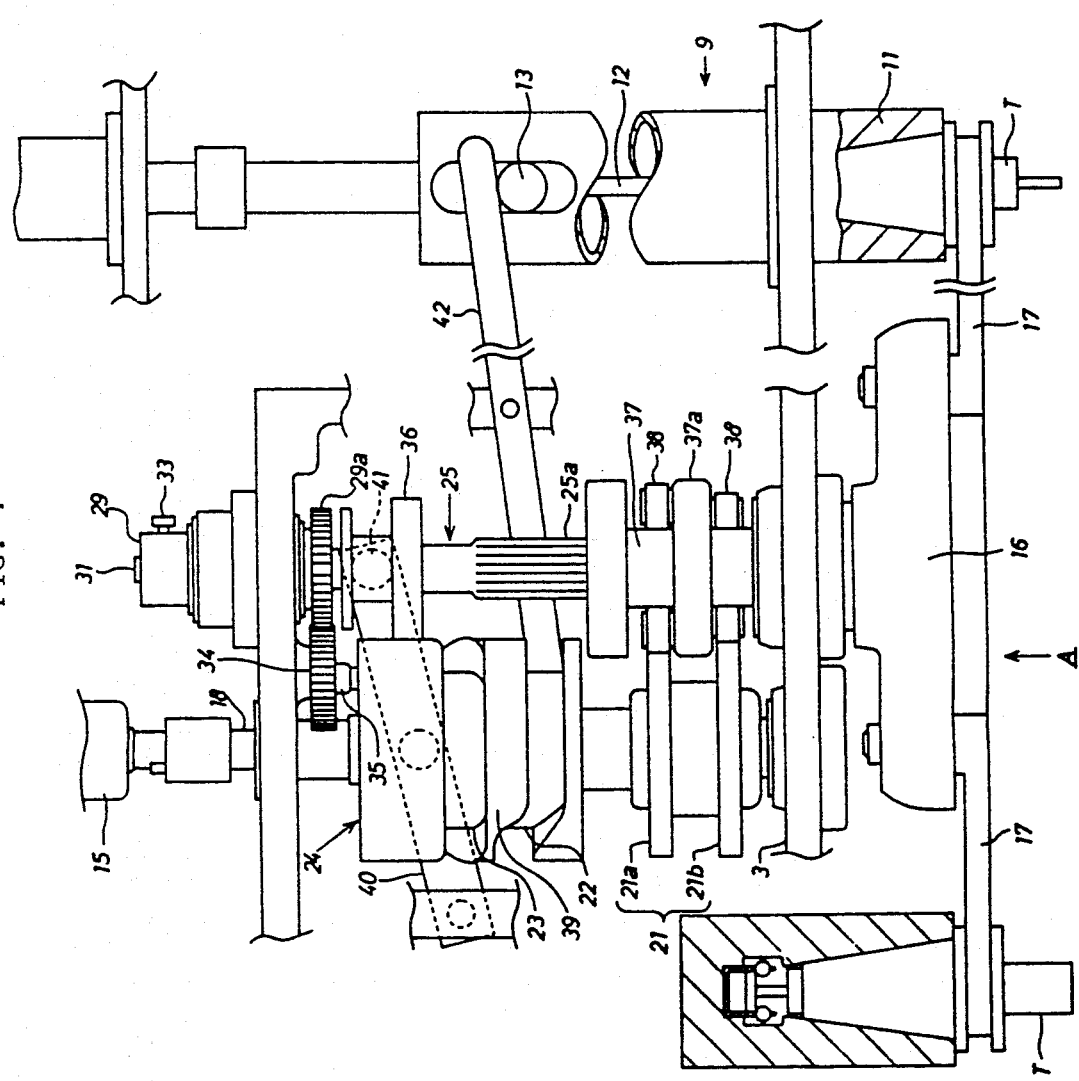
FIG. 4 is a partial cross-section view of the machining center in FIG. 3.

A spindle motor 8, a spindle 9, and a tool magazine 10 of rotary type are carried on the spindle mount 3. The spindle 9 and the tool magazine 10 are similar to the counterparts disclosed in Japanese Published Unexamined Patent Application No. S63-123646. Therefore, the structure of the spindle 9 and the tool magazine 10 is described only briefly herein. As shown in FIGS. 3 and 4, the spindle 9 includes a mounting portion 11, and a release pin 13 connected to the mounting portion 11 via a bar 12. A tool T is detachably held by the mounting portion 11. When the release pin 13 is depressed, the tool T is released. The tool magazine 10 has multiple holding pots arranged at the periphery of a rotary disk. Tools T are detachably held by each holding pot which normally assumes a horizontal posture. The lowest holding pot is rotated 90° downwardly to a vertical posture, and the tools can be exchanged by a rotating arm A. The tool T is selected and moved into the lowest position for exchange by rotating a magazine motor 14.

A tool exchange device TC is incorporated in the spindle mount 3 for exchanging the tool T between the tool magazine 10 and the spindle 9. The tool exchange device TC includes a tool exchange motor 15 (hereinafter referred to as the ATC motor) and the rotating arm A.

In the embodiment, the rotating arm A comprises an arm body 16 and two pairs of fingers 17 extending outwardly symmetrically from the axis of the arm body 16. The fingers 17 of each pair can be opened and closed. When the fingers 17 grip the tools T by opening and closing and the arm body 16 rotates, the tool T on the spindle 9 is exchanged with the tool T in the tool magazine 10.

A mechanism for driving the rotating arm A in the machining center will now be described.

Figure 5:
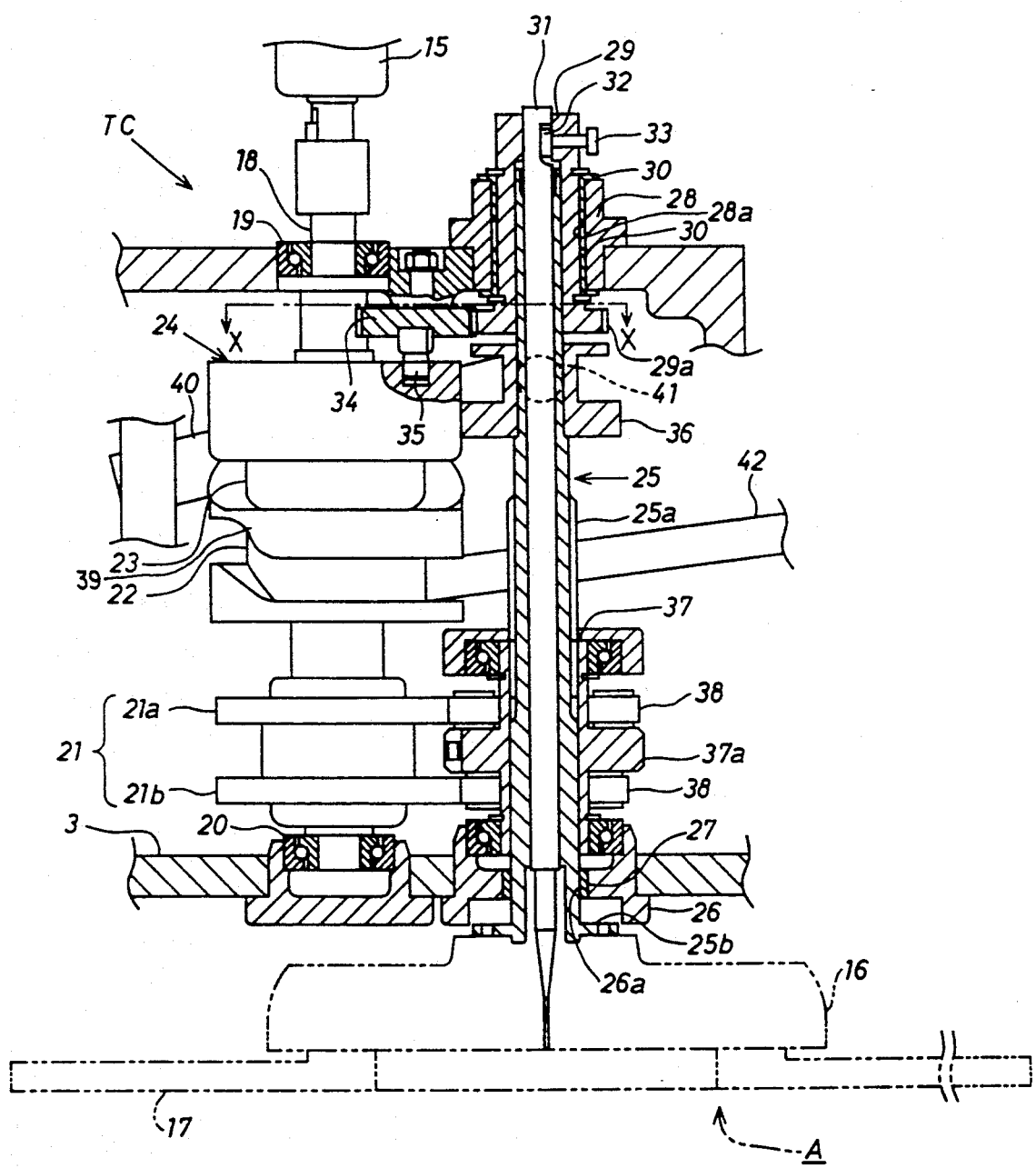
FIG. 5 is a partial cross-sectional view of a tool exchange device.

First, the entire structure of the tool exchange device TC is now described, referring to FIG. 5.

As shown in FIG. 5, the tool exchange device TC has a tool exchange drive shaft 18 (hereinafter referred to as the ATC drive shaft) extending vertically. One end of the ATC drive shaft 18 is connected to the ATC motor 15, and the other end of the ATC drive shaft 18 is pivotably supported on the spindle mount 3 via bearings 19 and 20. Four cams 21, 22, 23, 24 are provided on the ATC drive shaft 18.

A hollow shaft 25 is vertically arranged at the side of the ATC drive shaft 18. The hollow shaft 25 has a spline 25a in its middle, and a barb 25b at its lower end. The lower end of the hollow shaft 25 extends through a hole 26a in a lower frame 26 of the spindle mount 3 and is supported by a bushing 27 so as to be rotatable about its central axis and movable back and forth along the central axis. The upper end of the hollow shaft 25 extends through a hole 28a in an upper frame 28 of the spindle mount 3. A support member 29 and a bushing 30 are rotatably mounted between the upper frame 28 and the hollow shaft 25. The support member 29 is a cylinder with a central hole, and vertical movement of the support member 29 is controlled. The upper part of the hollow shaft 25 is inserted into the lower part of the central hole in the support member 29. The diameter of the upper part of the central hole is smaller than that of the lower part of the central hole in the support member 29. The upper part of the central hole in the support member 29 receives the upper end of a central shaft 31 extending through the hollow shaft 25. The upper end of the central shaft 31 is secured via a key 32 and a bolt 33 in the support member 29. The support member has on its lower outer periphery a gear 29a. The gear 29a meshes with a segment gear 34. A rotor 35 secured to the segment gear 34 follows the movement of the cam 24. The cam 24 transmits the movement to the support member 29. The hollow shaft 25 is inserted between the inner periphery of the support member 29 and the outer periphery of the central shaft 31, but the hollow shaft 25 is not secured to the support member 29 or the central shaft 31. Therefore, the hollow shaft 25 can rotate about its axis independently from the support member 29 and the central shaft 31.

Figure 2:
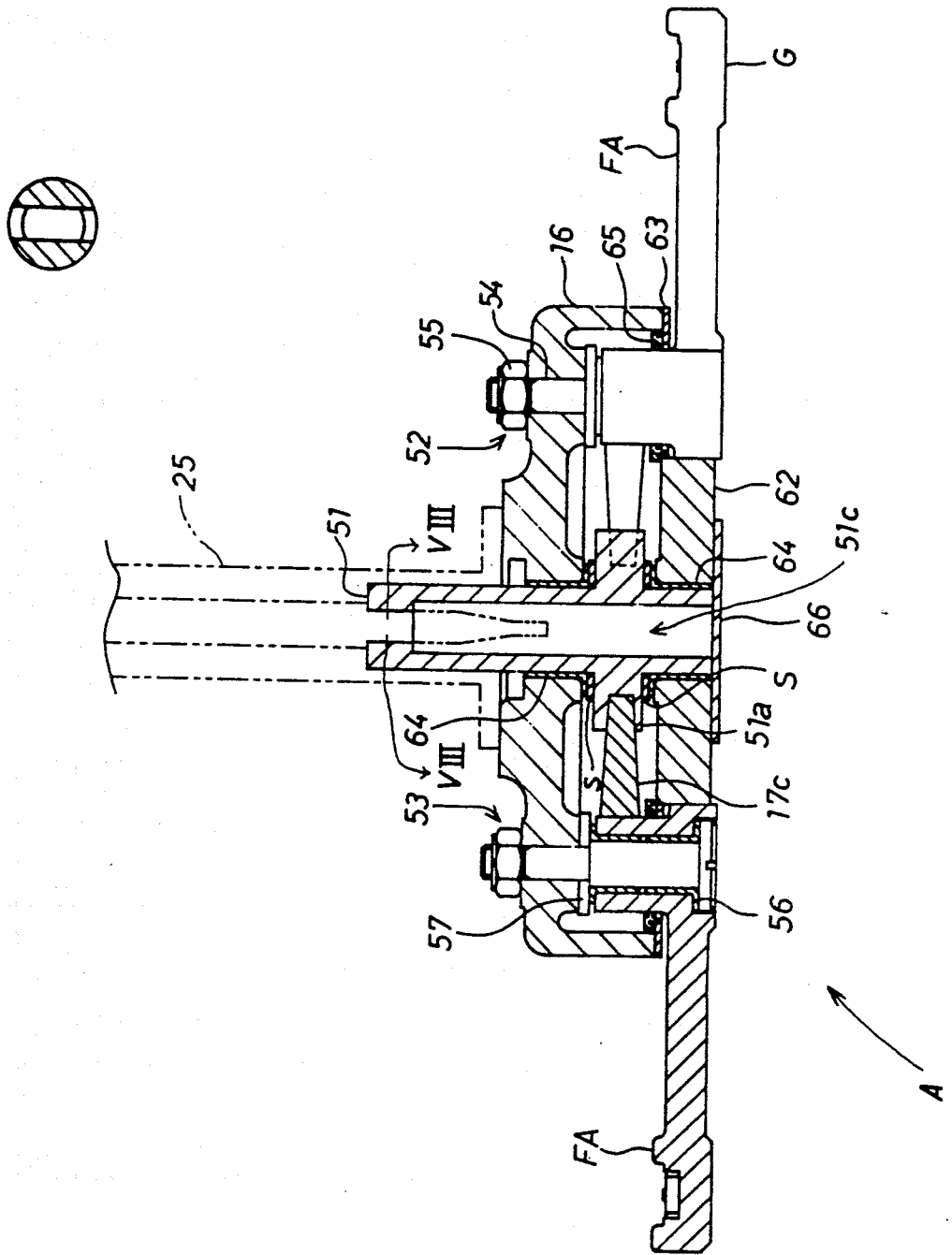
FIG. 2 is a longitudinal cross-sectional view of the rotating arm.

A cylindrical member 36 having a circumferential groove is fixed to the hollow shaft 25. The hollow shaft 25 is moved vertically by moving the cylindrical member 36 upward or downward. A countershaft 37 splines the spline 25a on the lower half of the shaft 25. When the countershaft 37 rotates about its axis, the hollow shaft 25 rotates. A projection 37a is formed on the outer surface of the countershaft 37, and cam follower rollers 38 are mounted above and below the projection 37a. As shown in FIG. 2, the barb 25b at the lowest end of the hollow shaft 25 is screwed to the arm body 16 of the rotating arm A near a cam shaft 51. Therefore, the hollow shaft 25 interlocks with the arm body 16. However, since the hollow shaft 25 is not secured to the cam shaft 51, the hollow shaft 25 does not interlock with the cam shaft 51.

As shown in FIG. 9, three portions of different shapes are continuously formed vertically on the lower end of the central shaft 31 extending through the hollow shaft 25.

The lowest portion of the three portions is a thin rod 31a. The middle port portion 31b tapering toward the thin rod 31a. The uppermost portion is a thick rod 31c formed by two opposite planes parallel to the axis of the central shaft 31 and by cylindrical surfaces. As shown in FIGS. 2 and 8, the diameter of the thin rod 31a is smaller than the width of a groove in a hollow 51c. The thick rod 31c fits in the groove.

When the hollow shaft 25 and the rotating arm A fixed to the hollow shaft 25 move vertically, the cam shaft 51 of the rotating arm A moves close to or away from the central shaft 31.

When the central shaft 31 is remotest from the rotating arm A, the thin rod 31a at the end of the central shaft 31 is inserted in the groove in the cam shaft 51. When the central shaft 31 comes near the rotating arm A, the conical portion 31b slides along the groove, and the thick rod 31c fits in the groove in the cam shaft 51.

Specifically, when the central shaft 31 approaches the cam shaft 51, the thin rod 31a first guides the central shaft 31 into the groove, the conical surface 31b slides in the groove, and the thick rod 31c then fits in the groove in the cam shaft 51. Consequently, the central shaft 31 securely engages with the cam shaft 51 of the rotating arm A.

The movement of the rotating arm A for the embodiment relative to the cams 21 through 24 mounted on the ATC drive shaft 18 will now be described.

The rotating arm A is rotated horizontally, thereby exchanging the tool T on the spindle 9 with the tool T in the tool magazine 10. In the mechanism for driving the rotating arm A, the cam 21 between the upper frame 28 and the lower frame 26 is related to the horizontal rotation of the rotating arm A. The movement of the cams 21 through 23 is similar to that disclosed in Japanese Published Unexamined Patent Application S63-123646, and is thus described only briefly herein. The cam 21 is a composite parallel cam consisting of two leaf cams 21a and 21b. As shown in FIGS. 4 and 5, the leaf cams 21a and 21b contact the cam follower rollers 38 attached to the countershaft 37. When the ATC drive shaft 18 rotates once, the countershaft 37, the hollow shaft 25 splined to the countershaft 37, and the rotating arm A rotates 180°.

At the same time, the rotating arm A vertically moves along the axis of the hollow shaft 25, thereby taking out the tools T from the spindle 9 and the tool magazine 10 or clamping the tools T. In the mechanism for driving the rotating arm A, the cam 23 between the upper frame 28 and the lower frame 26 is related to such movement of the rotating arm A. The cam 23 is grooved on the upper outer surface of a cylindrical member 39 secured to the ATC drive shaft 18. A contact member 41 is formed at the end of a rotating lever 40 that engages the cam 23, and engages the circumferential groove formed in the periphery of the cylindrical member 36 fixed to the outer surface of the hollow shaft 25. While the ATC drive shaft 18 rotates once, the hollow shaft 25 and the rotating arm A secured to the hollow shaft 25 move up and down once along the axis of the hollow shaft 25.

Figure 6:
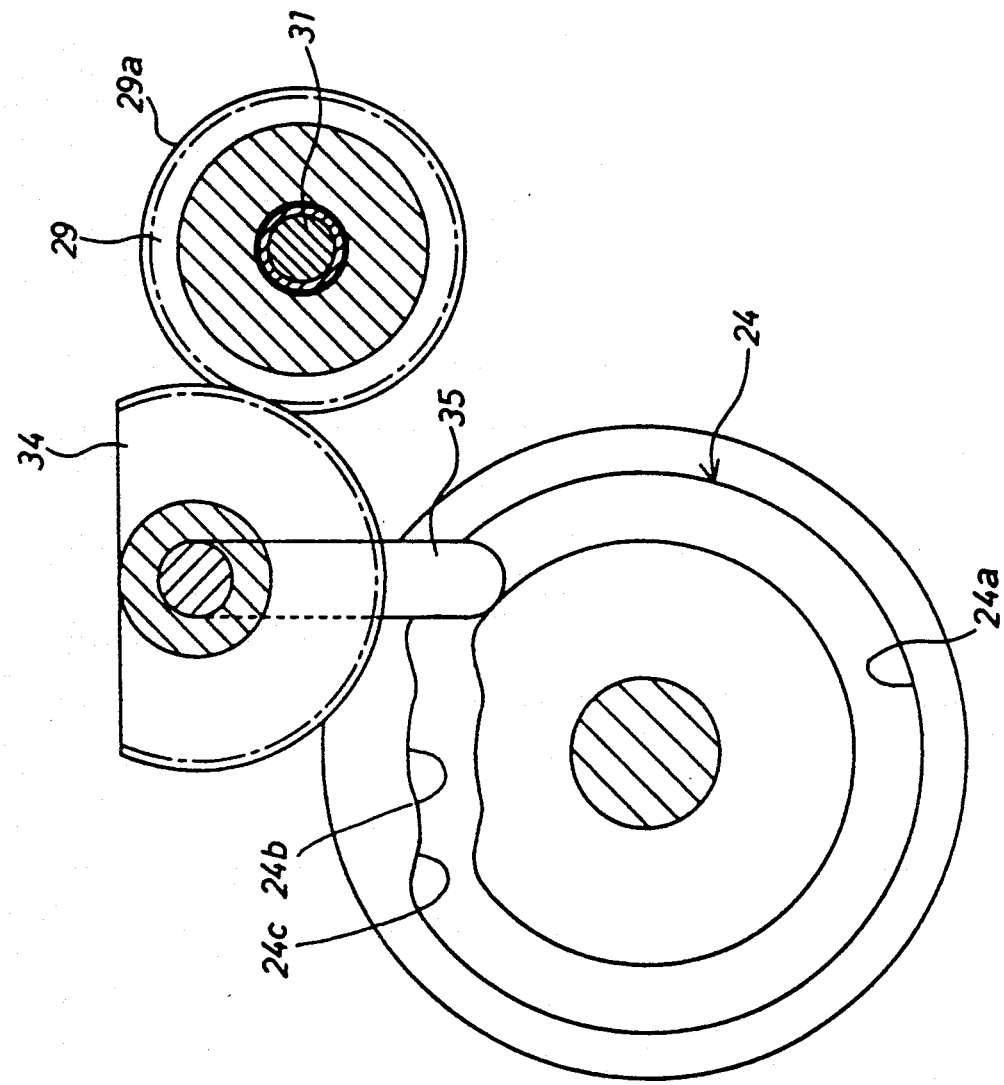
FIG. 6 is a cross-sectional view taken on line X—X of FIG. 5.

The pairs of fingers 17 of the rotating arm A are opened and closed. In the mechanism for driving the rotating arm A, the cam 24 grooved on the top of the cylindrical member 39 is secured to the ATC drive shaft 18. As shown in FIG. 6, which is a cross-sectional view taken on line X—X of FIG. 5, a groove in the cam 24 is in the form of a closed ring. The cam 24 comprises a larger portion 24a, a smaller portion 24b, and a transient portion 24c connecting the larger portion 24a and the smaller portion 24b. The larger portion 24a, the smaller portion 24b, and the transient portion 24c are formed in an arc around the axis of the cam 24. When the rotor 35 engages the larger portion 24a of the rotating cam 24, the fingers 17 of each pair are closed. When the rotor 35 engages the smaller portion 24b, the fingers 17 are opened. When the rotor 35 engages the transient portion 24c, the fingers 17 are opening or closing. This mechanism will be described in detail later.

As shown in FIGS. 4 and 5, the cam 22 is grooved in the lower outer periphery of the cylindrical member 39 secured to the outer surface of the ATC drive shaft 18. A rotating member 42 follows the movement of the cam 22, rotates, and depresses the release pin 13 connected to the bar 12 as a tool detaching device of the spindle 9. As a result, the tool T is disengaged from the mounting portion 11 of the spindle 9.

The relations among the above-described movements of the rotating arm A will now be described in detail successively.

Figure 1:
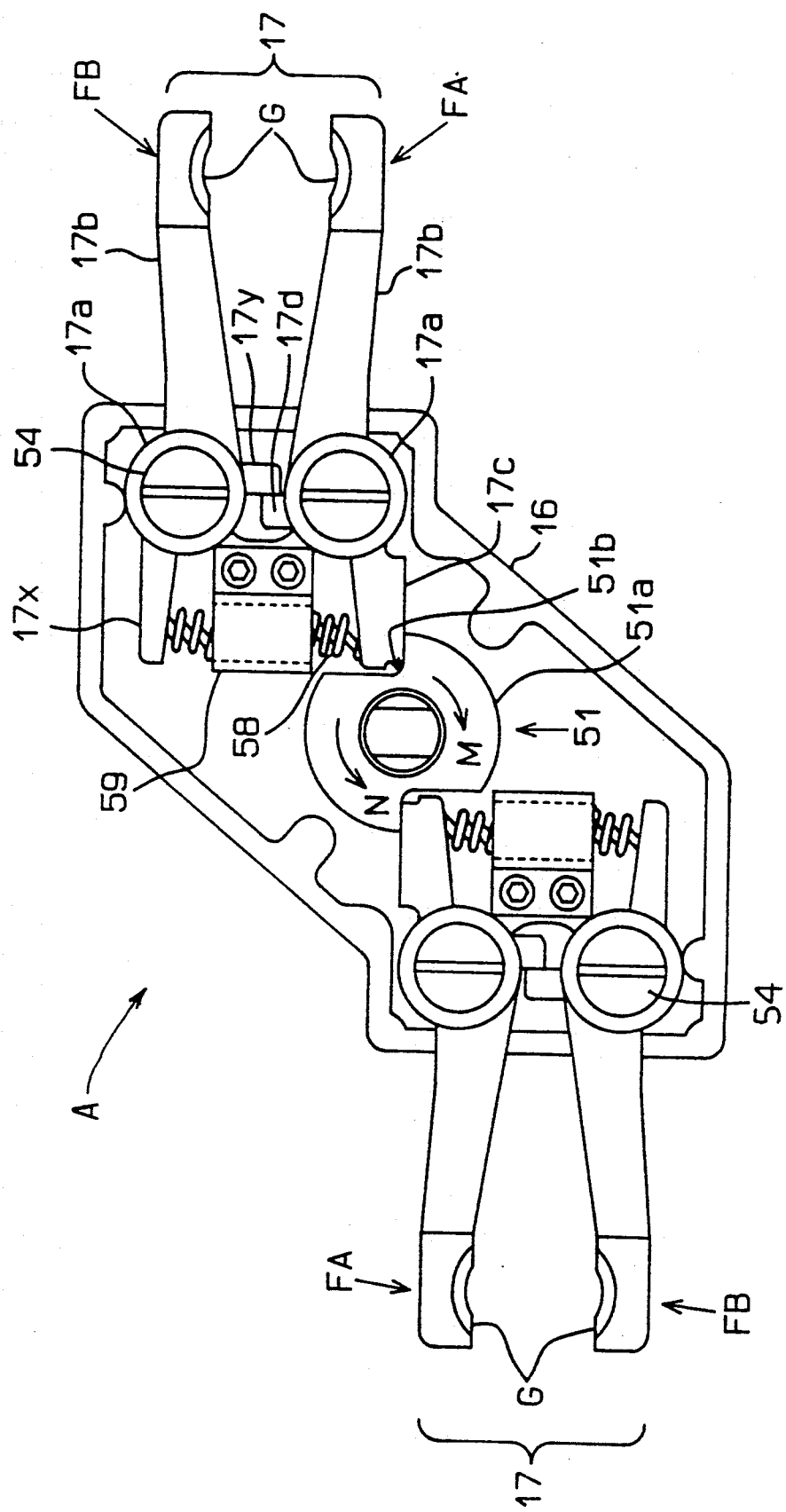
FIG. 1 is a view of main portions of a rotating arm, as viewed from below.

As shown in FIGS. 1 and 2, the arm body 16 of the rotating arm A is formed symmetrically with respect to its central hole. The cam shaft 51 is inserted in the central hole in the arm body 16 via a bushing 64 such that the cam shaft 51 rotates independently of the arm body 16. The cam shaft 51 composes an actuator for opening and closing the fingers 17 of the rotating arm A. As shown in FIG. 5, the arm body 16 is screwed to the barb 25b of the hollow shaft 25 around the cam shaft 51.

As shown in FIG. 2, the cam shaft 51 has near its vertical center a cam portion 51a extending horizontally. A spacer S is interposed between the cam portion 51a and the bushing 64. As shown in FIG. 1, the lower circular surface of the cam portion 51a is cut out at two symmetrical locations, thus forming two similar cutouts 51b. As shown in FIG. 8, the upper portion of the hollow 51c in the cam shaft 51 takes the form of a groove. When the central shaft 31 moves vertically, the end of the central shaft 31 can be engaged in or disengaged from the groove in the cam shaft 51.

As shown in FIG. 2, two pairs of holes 52 and 53 are formed in the upper surface of the arm body 16 symmetrically with respect to the cam shaft 51. Two pairs of fingers 17 of the same construction are mounted to the arm body 16 by inserting bolts 54 and nuts 55 in the holes 52 and 53.

As shown in FIG. 1, one finger FA of each pair of fingers 17, which is closer to the cam shaft 51 than the other finger FB, comprises a cylindrical portion 17a, a finger body 17b extending from the cylindrical portion 17a toward the outside of the arm body 16, a cam follower 17c for engaging the cam portion 51a, and a projection 17d projecting almost perpendicularly to the portions 17a through 17c. The bolts 54 are passed through the cylindrical portion 17a of the finger FA. The finger body 17b has gripping claws G at its end. The cam follower 17c extends from the cylindrical portion 17a toward the inside of the arm body 16. The fingers FA and the other fingers FB are substantially symmetrical except for the following points: each finger FB has a portion 17x which is opposite to the cam follower 17c and is slightly smaller than the cam follower 17c. Each finger FB also has an engaging portion 17y corresponding to the projection 17d. The engaging portion 17y is slightly shifted in position from the projection 17d.

The ends of the bolts 54 passed through the cylindrical portions 17a of the fingers FA and FB are held on the arm body 16 by the nuts 55 such that the bolts 54 can rotate about axes parallel to the axis of the cam shaft 51 of the rotating arm A, the projection 17d is opposed to the engaging portion 17y, and the cam follower 17c of each finger FA engages in the cutout 51b. A bushing 56 is inserted between the inner surface of each cylindrical portion 17a and the outer surface of the corresponding bolt 54, and a bearing washer 57 is inserted between the arm body 16 and the upper end surface of each cylindrical portion 17a.

A spring 58 is attached onto the arm body 16 by a spring holder 59 between the cam follower 17c and the portion 17x opposite to the cam follower 17c. The spring 58 opens the cam follower 17c and the portion 17x. Therefore, the finger bodies 17b are rotated toward each other about the cylindrical portions 17a to close. The cam follower 17c of each finger FA engages the cam portion 51a to prevent the finger FA from further moving toward the finger FB. The engaging portion 17y of each finger FB meshes with the projection 17d of the finger FA such that the finger FB is kept from moving further toward the finger FA.

When the cam follower 17c is pushed against the force of the spring 58, the finger FA rotates about the cylindrical portion 17a away from the finger FB. At the same time, since the engaging portion 17y of the finger FB is pressed against the projection 17d of the finger FA, the finger FB is rotated away from the finger FA. The fingers 17 of each pair are opened by rotating the cam portion 51a a given angle counterclockwise about its axis as shown by an arrow N and pressing the cam portion 51a against the cam follower 17c.

As shown in FIG. 2, the rotating arm A further includes a cam shaft depressor 62 and arm body depressors 63, thereby preventing powder produced by a cutting operation from entering the rotating arm A. The cam shaft depressor 62 is provided with a central hole through which the lower portion of the cam shaft 51 extends and with a bushing 64 between the cam shaft depressor 62 and the cam shaft 51. Each arm body depressor 63 is connected to the arm body 16 and has a hole through which the corresponding cylindrical portion 17a passes. The driving mechanism for driving the pairs of fingers 17 such as the springs 58 is housed in the space surrounded by the arm body 16, the cam shaft depressor 62, and the arm body depressors 63. Rubber seals 65 are inserted between the cylindrical portions 17a of the fingers and the holes in the arm body depressors 63. The space containing the driving mechanism of the rotating arm A is thus sealed. The cam shaft depressor 62 is connected to the arm body depressor 63. A disk 66 surrounds the central hole in the cam shaft depressor 62.

The movement of the rotating arm A and the related movement of other components will now be described, referring to FIG. 7.

When the tools are exchanged, the spindle 9 is stopped in a given position. Immediately after it is confirmed the spindle 9 is stopped in the given position, the ATC drive shaft 18 starts rotating. When the ATC drive shaft 18 starts rotating, the rotating arm A vertically movable is in an upper dead point, and the central shaft 31 engages with the cam shaft 51 of the rotating arm A. The cam portion 51a on the outer periphery of the cam shaft 51 presses the cam follower 17c of each finger FA, and the finger FA is rotated away from the finger FB against the force of the springs 58. Since the projection 17d of the finger FA presses the engaging portion 17y of the finger FB, the finger FB is also rotated away from the finger FA against the force of the spring 58. Two pairs of the fingers 17 are thus opened.

The tool T clamped by the spindle 9 is positioned between the gripping claws G of one of the two pairs of fingers 17 opened. The tool T clamped by the tool magazine 10 is positioned between the gripping claws G of the other pair of fingers 17.

When the ATC drive shaft 18 rotates 12°, the rotor 35 disengages from the smaller portion 24b of the cam 24, arrives on the transient portion 24c, and starts rotating. The segment gear 34, the support member 29, and the central shaft 31 follow the rotation of the rotor 35, and start rotating. When the central shaft 31 rotates, the cam shaft 51 of the rotating arm A engaging the central shaft 31 also starts rotating. Subsequently, the cam portion 51a on the outer periphery of the cam shaft 51 starts rotating clockwise as shown by an arrow M in FIG. 1, so that the fingers FA are not pushed. The springs 58 start closing the fingers FA. The movement of the fingers FA is transmitted to the engaging portions 17y of the fingers FB, and the fingers FB start closing by the force of the springs 58. When the ATC drive shaft 18 rotates 50° and the rotor 35 engages the larger portion 24a of the cam 24, the rotor 35 is stopped. Further, after the central shaft 31 rotates 18°, the central shaft 31 is stopped. The cam portion 51a of the cam shaft 51 is also stopped. Therefore, the cam portion 51a applies no force for opening the fingers FA. Therefore, the two pairs of the fingers 17 are closed by the springs 58, and grip the tools T on the spindle 9 and the tool magazine 10, respectively.

When the ATC drive shaft 18 rotates 25° and the pairs of fingers 17 are being closed, the release pin 13 begins to lower by the action of the cam 22. When the ATC drive shaft 18 rotates 75°, the tool T is completely released from the spindle 9.

When the ATC drive shaft 18 rotates 65° and the tool T is being released, the rotating arm A starts lowering by the cam 23. When the ATC drive shaft 18 rotates 125°, the arm A reaches the lower dead point. When the ATC drive shaft 18 rotates about 100°, the central shaft 31 disengages from the cam shaft 51 of the rotating arm A.

When the rotating arm A moves from the upper dead point to the lower dead point, the tool T is taken from the tool magazine 10. When the ATC drive shaft 18 rotates 100°, the rotating arm A starts rotating by the action of the cam 21 and the like. When the ATC drive shaft 18 rotates 280°, the rotating arm A finishes rotating. The tool T on the spindle 9 is exchanged with the tool T in the tool magazine 10.

When the ATC drive shaft 18 rotates 235° and while the rotating arm A is rotating, the rotating arm A starts rising from the lower dead point. When the ATC drive shaft 18 rotates 295°, the rotating arm A reaches the upper dead point. The tool T is inserted into the tool magazine 10 and clamped. On the other hand, another tool T is inserted into the spindle 9 but is not yet clamped. When the ATC drive shaft 18 rotates about 270°, the central shaft 31 engages the cam shaft 51 of the rotating arm A. As aforementioned, the thin rod 31a of the central shaft 31 guides the central shaft 31 along the hollow 51c of the cam shaft 51, the conical portion 31b slides in the hollow 51c, and the thick rod 31c engages in the hollow 51c. The cam shaft 51 and the central shaft 31 are thus securely engaged.

When the ATC drive shaft 18 rotates 285° and the rotating arm A moves from the lower dead point to the upper dead point, the release pin 13 starts rising by the action of the cam 22. When the ATC drive shaft 18 rotates 335°, the release pin 13 returns to its initial position, and the tool T is completely clamped by the spindle 9.

When the ATC drive shaft 18 rotates 310° and the spindle 9 starts clamping the tool T, the larger portion 24a of the cam 24 disengages from the rotor 35 and engages the transient portion 24c of the cam 24. The rotor 35 in turn restarts rotating the central shaft 31 in reverse. The cam shaft 51 of the rotating arm A engaging the central shaft 31 also rotates in reverse. The cam portion 51a on the outer periphery of the cam shaft 51 starts rotating counterclockwise as shown by the arrow N in FIG. 1, and pushes the cam followers 17c of the fingers FA, so that the fingers FA begin to open. The movement of the cam followers 17c is transmitted from the projections 17d of the fingers FA to the engaging portions 17y of the fingers FB. The two pairs of fingers 17 thus start opening.

When the ATC drive shaft 18 rotates 348° and the rotor 35 reaches the smaller portion 24b of the cam 24, the rotor 35 stops rotating, and the central shaft 31 returns to its initial stationary state. The cam portion 51a of the cam shaft 51 also returns to its initial stationary state, and pushes the cam followers 17c of the fingers FA. As a result, the fingers FA are opened. The movement of the fingers FA is transmitted to the engaging portions 17y of the fingers FB, thus opening the fingers FB. As a result, the pairs of fingers 17 release the tools T in the tool magazine 10 and on the spindle 9, respectively.

In the embodiment, the rotating arm A has the following advantages.

The force of the springs 58 is applied to the fingers FA and FB of the rotating arm A. The movement of the cam portion 51a is directly applied to the cam followers 17c of the fingers FA and is transmitted to the engaging portions 17y of the fingers FB. The fingers 17 are thus opened or closed. Driving force is directly applied to the pairs of fingers 17 by non-backlashing members without using any transmitting member such as a lever. The movement and the opening and closing timing of the fingers 17 can be accurately controlled. The fingers 17 can securely, quickly and correctly grip the tools T without failure. The tools T can thus securely be mounted on or taken out from the spindle 9.

At the same time, the structure of the embodiment is simple, and no complex mechanism such as a hydraulic or interlocking mechanism is used.

The tools T of various sizes can easily be gripped by the springs 58. If any external force is applied to the tools T, the springs 58 can act as shock absorbers, thereby preventing the pairs of fingers 17 from being damaged.

The portions for driving the pairs of fingers 17 are covered by the arm body 16 from above and are shielded by the arm body depressors 63, the rubber seals 65, and the like from below. The particles resulting from machining operation by the tool T on the spindle 9 are prevented from entering the driving portions or hindering the movement of the driving portions.

In the embodiment, the tool exchange arm employs no complex mechanism such as a hydraulic mechanism, a linkage mechanism, or an interlocking mechanism. The tool exchange arm is simple in structure, and consists of a small number of components, thereby facilitating the manufacturing of the tool exchange arm and reducing the cost of manufacture.

The cam 24, the rotor 35, and the segment gear 34 for rotating the rotating member 29 and driving the central shaft 31 secured to the rotating member 29 are mounted beside the rotating member 29. Therefore, the machining center for the embodiment can be built low and compact.

Since the rotating member 29 stably supports the hollow shaft 25, the hollow shaft 25 can stably operate. Although the hollow shaft 25 supported on the spindle mount 3 tends to vibrate according to the rotation of the cam 21 and the vertical movement of the cam 23, the rotating member 29 supports the inside of the hollow shaft 25. The hollow shaft 25 is thus securely supported upright. The rotating member 29 performs as the member for rotating the central shaft 31 and for supporting the hollow shaft 25, thus contributing to the simplification of the entire structure of the machining center.

When the central shaft 31 engages in the cam shaft 51, the thin rod 31a of the central shaft 31 guides the central shaft 31 into the groove of the hollow 51c in the cam shaft 51, the conical portion 31b slides along the groove, and the thick rod 31c fits in the groove. Therefore, the central shaft 31 and the cam shaft 51 of the rotating arm A always securely engage each other. Consequently, the movement of the pairs of fingers 17 is securely controlled.

This invention has been described above with reference to the preferred embodiment. Modifications and alterations may become apparent to one skilled in the art upon reading and understanding the specification. It is intended to include all such modifications and alterations within the scope of the appended claims. For example, springs can be provided between the fingers of each pair such that the claws at the ends of the fingers can open, and the cam for driving the fingers can act on the cam followers of the fingers to close the fingers. The rotating arm A in the embodiment can be replaced by the tool exchange arm disclosed in Japanese Published Unexamined Patent Application No. S63-123646.

What is claimed is:

1. A tool exchange device for a machine tool having a spindle head, a spindle mounted on the spindle head such that the spindle rotates about a spindle axis, and a tool for machining a work piece detachably mounted on the spindle, the tool exchange device comprising:
   a central shaft mounted on the spindle head such that the central shaft is rotatable about a tool exchange axis, where the tool exchange axis is parallel to the spindle axis;
   a hollow shaft coaxially mounted around the central shaft, where the hollow shaft is movable along and rotatable about the tool exchange axis relative to the central shaft;
   a drive shaft mounted on the spindle head adjacent to the tool exchange axis such that the drive shaft is rotatable about a drive axis, where the drive axis is parallel to the tool exchange axis;
   tool storing means for storing a next desired tool.
   tool exchange means attached to the hollow shaft, the tool exchange means comprising first and second grasping means mounted on a tool exchange arm for grasping the tool in the spindle and the next desired tool according to the rotation of the central shaft, spring means acting on each of the grasping means to force each of the grasping means into a closed, grasping orientation, and opening means acting between the tool exchange arm and the grasping means to force each of the grasping means into an open, non-grasping orientation against the force of the spring means;
   removal means mounted on the drive shaft for lowering the hollow shaft to remove the tool from the spindle and raising the hollow shaft to insert the tool into the spindle;
   release means mounted on the drive shaft for releasing the tool from the spindle;
   rotation means mounted on the drive shaft for rotating the central shaft to operate the grasping means of the tool exchange means; and
   exchange means mounted on the drive shaft for rotating the hollow shaft and tool exchange means about the tool exchange axis to exchange the next desired tool for the tool into the spindle.

2. The tool exchange device of claim 1, in which the removal means, release means, rotation means, and exchange means are formed such that, during one revolution of the drive shaft:
   the rotation means first rotate the central shaft to close the grasping means around the tool in the spindle and the next desired tool;
   the release means next press the release button to release the tool in the spindle;
   the removal means next move the hollow shaft along the tool exchange axis in a first direction;
   the exchange means next rotate the tool exchange means to exchange the next desired tool for the tool in the spindle;
   the removal means next move the hollow shaft along the tool exchange axis in a second direction;
   the release means next stops pressing the release button and the spindle grasps the next desired tool; and
   the rotation means next rotates the central shaft to open the grasping fingers.

3. The tool exchange device of claim 1, in which the opening means comprises:
   a grasp cam rotatable about the tool exchange axis for contacting a cam follower member to open the grasping fingers when the grasp cam rotates in a first grasping direction and to close the grasping fingers when the grasp cam rotates in a second grasping direction; wherein
   the first and second grasping means selectively grasp tools by opening and closing grasping fingers; and
   when the drive shaft rotates the rotation means about the drive axis, the central shaft rotates the grasp cam about the tool exchange axis in the first grasping direction and then in the second grasping direction.

4. The tool exchange device of claim 3, further comprising engaging means mounted on the central shaft for penetrating a hole formed in the grasp cam along the tool exchange axis when the exchange means moves the tool exchange means in the first direction along the tool exchange axis and gradually engaging the grasp cam such that axial rotation of the central shaft about the tool exchange axis is transferred to the grasp cam.

5. The tool exchange device of claim 1, in which:
   the tool exchange arm is rotatable about the tool exchange axis;
   one grasping means is mounted on each end of the tool exchange arm; and
   the tool exchange means is connected to the hollow shaft such that, when the hollow shaft rotates about the tool exchange axis, the tool exchange arm rotates and exchanges the next desired tool for the tool in the spindle.

6. The tool exchange device of claim 1, further comprising:
   a cylindrical member coaxially mounted on the drive shaft; wherein
   the removal means comprises a removal cam groove formed on the outer surface of the cylindrical member; and
   a removal pivot member is fixed at one end, is attached at another end to the hollow shaft, and engages the removal cam groove, where, as the cylindrical member rotates, the cam groove acts on the removal pivot member such that the end of the removal pivot member attached to the hollow shaft is moved in first and second directions along the tool exchange axis, thereby moving the hollow shaft in first and second directions along the tool exchange axis.

7. The tool exchange device of claim 1, further comprising:

a cylindrical member coaxially mounted on the drive shaft; wherein the release means comprises a release cam groove formed on the outer surface of the cylindrical member; and one end of a release pivot member engages the release cam groove, a middle portion of the release pivot member is fixed at a fulcrum point, and the other end of the release pivot member is adjacent to the release button, where, as the drive shaft rotates about the drive axis, the release cam groove acts on the release pivot member such that the end of the release pivot member adjacent to the release button presses the release button during a portion of the rotation of the drive shaft about the drive axis.

8. The tool exchange device of claim 1, further comprising:

a cylindrical member coaxially mounted on the drive shaft;

a segment gear mounted adjacent to a first end of the cylindrical member and the central shaft, where a first end of a rotor member is attached to the segment gear such that the rotor member rotates the segment gear about a segment gear axis parallel to the drive axis when a second end of the rotor member is rotated about the segment gear axis; and a shaft gear mounted on the central shaft, where the shaft gear meshes with the segment gear such that the shaft gear rotates the central shaft about the tool exchange axis in an opposite direction to the rotation of the segment gear; wherein the rotation means comprises a rotation cam groove formed on an end surface on the first end of the cylindrical member; and the second end of the rotor member engages the rotation cam groove such that, when the drive shaft rotates about the drive axis, the rotation cam groove acts on the second end of the rotor member to rotate the rotor member in the second direction about the segment gear axis and then in the first direction about the segment gear axis.

9. The tool exchange device of claim 1, in which the rotation means comprises a rotation cam groove having:

an open portion formed from an arc having a first radius as measured from the drive axis;

a closed portion formed from an arc having a second radius as measured from the drive axis that is longer than the first radius;

an opening portion connected to the open portion and the closed portion such that the distance from the opening portion to the drive axis increases from the point where the opening portion is connected to the open portion to the point where the opening portion is connected to the closed portion; and a closing portion connected to the open portion and the closed portion such that the distance from the opening portion to the drive axis decreases from the point where the opening portion is connected to the open portion to the point where the opening portion is connected to the closed portion; wherein as the drive shaft turns, the rotation cam contacts a rotor member connected to the central shaft such that the rotor member does not rotate the central shaft when the rotor member contacts the open and closed portions of the rotation cam groove, the rotation member rotates the central shaft to close the grasping means when the rotor member contacts the closing portion of the rotation cam groove, and the rotation member rotates the central shaft to open the grasping means when the rotor member contacts the opening portion of the rotation cam groove.

10. A tool exchange device for a machine tool having a spindle head, a spindle mounted on the spindle head such that the spindle rotates about a spindle axis, a tool for machining a work piece detachably mounted on the spindle, and release means for releasing the tool from the spindle while a release button is pressed, the tool exchange device comprising:

a central shaft mounted on the spindle head such that the central shaft is rotatable about a tool exchange axis, where the tool exchange axis is parallel to the spindle axis;

a hollow shaft coaxially mounted around the central shaft, where the hollow shaft is movable along and rotatable about the tool exchange axis relative to the central shaft;

a drive shaft mounted on the spindle head adjacent to the tool exchange axis such that the drive shaft is rotatable about a drive axis, where the drive axis is parallel to the tool exchange axis;

a cylindrical member coaxially mounted on the drive shaft;

tool storing means for storing a next desired tool;

a tool exchange arm rotatable about a tool exchange axis, where the tool exchange arm is connected to the hollow shaft such that, when the hollow shaft rotates about the tool exchange axis, the tool exchange arm rotates and exchanges a next desired tool for a tool in the spindle;

first and second grasping means mounted on the tool exchange arm for selectively grasping tools by opening and closing grasping fingers;

spring means acting on each of the grasping means to force the grasping fingers closed;

a grasp cam means mounted in the tool exchange arm and rotatable about the tool exchange axis for contacting a cam follower member to open the grasping fingers against the force of the spring means when the grasp cam means rotates in a first grasping direction and to close the grasping fingers when the grasp cam means rotates in a second grasping direction;

a removal cam groove formed on the cylindrical member for contacting a removal pivot member when the drive shaft rotates about the drive axis such that the removal pivot member moves the hollow shaft in the first and second directions along the tool exchange axis;

a release cam groove formed on the cylindrical member for contacting a release pivot member when the drive shaft rotates about the drive axis such that the release pivot member presses the release button;

a rotation cam groove formed on the cylindrical member for contacting a rotor member when the drive shaft rotates about the drive axis such that the rotor member causes the central shaft to rotate about the tool exchange axis; and exchange cam means mounted on the drive shaft for contacting cam following rollers when the drive shaft rotates about the drive axis such that the cam following rollers rotate the hollow shaft about the tool exchange axis.

11. The tool exchange device of claim 10, further comprising engaging means mounted on the central shaft for penetrating a hole formed in the grasp cam means along the tool exchange axis when the exchange cam means moves the tool exchange means in the first direction along the tool exchange axis and gradually engaging the grasp cam means such that axial rotation of the central shaft about the tool exchange axis is transferred to the grasp cam means.

12. The tool exchange device of claim 11, in which the removal pivot member is fixed at one end, is attached at another end to the hollow shaft, and engages the removal groove, where, as the cylindrical member rotates, the groove acts on the removal pivot member such that the end of the removal pivot member attached to the hollow shaft is moved in first and second directions along the tool exchange axis, thereby moving the hollow shaft in first and second directions along the tool exchange axis.

13. The tool exchange device of claim 10, in which one end of the release pivot member engages the release groove, a middle portion of the release pivot member is fixed at a fulcrum point, and the other end of the release pivot member is adjacent to the release button, where, as the drive shaft rotates about the drive axis, the release groove acts on the release pivot member such that the end of the release pivot member adjacent to the release button presses the release button during a portion of the rotation of the drive shaft about the drive axis.

14. The tool exchange device of claim 10, further comprising:
   a segment gear mounted adjacent to a first end of the cylindrical member and the central shaft, where a first end of the rotor member is attached to the segment gear such that the rotor member rotates the segment gear about a segment gear axis parallel to the drive axis when a second end of the rotor member is rotated about the segment gear axis; and
   a shaft gear mounted on the central shaft, where the shaft gear meshes with the segment gear such that the shaft gear rotates the central shaft about the tool exchange axis in an opposite direction to the rotation of the segment gear; wherein
   rotation means comprises a rotation cam groove formed on an end surface on the first end of the cylindrical member; and
   the second end of the rotor member engages the rotation cam groove such that, when the drive shaft rotates about the drive axis, the rotation cam groove acts on the second end of the rotor member to rotate the rotor member in the second direction about the segment gear axis and then in the first direction about the segment gear axis.

15. The tool exchange device of claim 14, in which the rotation cam groove comprises:
   an open portion formed from an arc having a first radius as measured from the drive axis;
   a closed portion formed from an arc having a second radius as measured from the drive axis that is longer than the first radius;
   an opening portion connected to the open portion and the closed portion such that the distance from the opening portion to the drive axis increases from the point where the opening portion is connected to the open portion to the point where the opening portion is connected to the closed portion; and
   a closing portion connected to the open portion and the closed portion such that the distance from the opening portion to the drive axis decreases from the point where the opening portion is connected to the open portion to the point where the opening portion is connected to the closed portion; wherein
   as the drive shaft turns, the rotation cam contacts the second end of the rotor member such that the second end of the rotor member does not rotate about the segment gear axis when the second end of the rotor member contacts the open and closed portions of the rotation cam groove, the second end of the rotation member rotates in the second direction about the segment gear axis when the second end of the rotor member contacts the closing portion of the rotation cam groove, and the second end of the rotation member rotates in the first direction about the segment gear axis when the second end of the rotor member contacts the opening portion of the rotation cam groove.

16. The tool exchange device of claim 10, in which the removal cam groove, release cam groove, rotation cam groove, and exchange cam groove are formed such that, during one revolution of the drive shaft:
   the rotation cam groove first rotates the central shaft to close the grasping fingers around the tool in the spindle and the next desired tool;
   the release cam groove next contacts the release pivot member such that the release pivot member presses the release button to release the tool in the spindle;
   the removal cam groove next contacts the removal pivot member to move the tool exchange means along the tool exchange axis in the first direction;
   the exchange cam groove next contacts the exchange cam follows to rotate the tool exchange means and exchange the next desired tool for the tool in the spindle;
   the removal cam groove next contacts the removal pivot member to move the tool exchange emans along the tool exchange axis in the second direction;
   the release cam groove next contacts the release pivot member such that the release pivot member does not press the release button and the spindle grasps the next desired tool; and
   the rotation cam groove next rotates the central shaft to open the grasping fingers.

17. A tool exchange arm for a tool exchange device of a machine tool, comprising:
   a tool exchange arm body rotatable about a tool exchange axis;
   a pair of first and second grasping fingers mounted on each end of the tool exchange arm body for grasping tools, where the grasping fingers are rotatable about finger axes parallel to the tool exchange axis;
   spring means acting on each pair of grasping fingers to force the grasping fingers about the finger axes to close the pairs of fingers;
   a grasp cam means rotatably mounted in the tool exchange body; and
   a grasp cam following means mounted on each pair of grasping fingers such that, when the grasp cam means rotates in a first grasping direction, the grasping fingers rotate about the finger axes to close the pairs of grasping fingers and, when the grasp cam means rotates in a second grasping direction, the grasping fingers rotate about the finger axes against the force of the spring means to open the pairs of grasping fingers.

18. The tool exchange arm of claim 17, in which:

the grasp cam following means and a grasping projection are integrally formed on the first finger of each pair of grasping fingers;

engaging projections for engaging the grasping projections are integrally formed on the second finger of each pair of grasping fingers; wherein the grasp cams rotate the grasp cam following means against the force of the spring to rotate the first fingers away from the second fingers to open the pairs of grasping fingers; and the grasping projections rotate the engaging projections against the force of the spring to rotate the second fingers away the first fingers to open the pairs of grasping fingers.

19. The tool exchange arm of claim 17, in which:

the grasp cam means is a disk rotatable about the tool exchange axis and having cam portions formed thereon, where each cam portion has an abutting surface extending substantially radially from the tool exchange axis; and the grasp cam follower means in a following projection extending from each pair of grasping fingers that abuts the abutting surface of the grasp cam means, where the abutting surface contacts and moves the following projection when the disk rotates in the first grasping direction about the tool exchange axis.

20. A driving mechanism for a tool exchange device of a machine tool for driving a tool exchange arm having a cam actuator mounted thereon which acts upon a cam follower to open grasping means on the tool exchange arm against the force of spring means which maintains the grasping means in a normally closed orientation, the driving mechanism comprising:

a hollow shaft supported at a first end on a housing of the tool machine such that the hollow shaft can move along and rotate about a tool exchange axis, where the hollow shaft is connected at a second end to the tool exchange arm;

a central shaft coaxially mounted within the hollow shaft for engaging the cam actuator, where the central shaft actuates the cam actuator when the central shaft rotates about the tool exchange axis;

a rotating member rotatably attached to the housing and coupled to the central shaft;

hollow shaft drive means for rotating the hollow shaft about and moving the hollow shaft along the tool exchange axis; and rotating member drive means for rotating the rotating member, thereby rotating the central shaft and actuating the cam actuator to act upon the cam follower to open the grasping means against the force of the spring means or to close the grasping means with the force of the spring means.

21. The driving mechanism of claim 20, in which:

the central shaft is mounted along the tool exchange axis such that the central shaft axially rotates about the tool exchange axis independently of the tool exchange arm body;

the cam actuator comprises grasp cam means that rotates about the tool exchange axis;

a hole is formed on the grasp cam means along the tool exchange axis; and an engaging end of the central shaft engages the hole in the grasp cam means to rotate the grasp cam means in first and second grasping directions about the tool exchange axis.

22. The driving mechanism of claim 21, in which the hole in the grasp cam means is designed to match a transfer portion of the engaging end of the central shaft such that axial rotation of the central shaft about the tool exchange axis is transferred to the grasp cam means.

23. The driving mechanism of claim 22, in which the engaging end of the central shaft further comprises:

a guide portion on the tip of the engaging end; and a sliding portion formed between the guide portion and the transfer portion for gradually engaging the transfer portion of the central shaft and the hole in the grasp cam means.

24. The driving mechanism of claim 23, in which:

a cross-sectional area of the guide portion is smaller than a cross-sectional area of the transfer portion; and the cross-sectional area of the sliding portion gradually increases from the guide portion to the transfer portion.

25. The driving mechanism of claim 20, further comprising:

a drive shaft mounted on the housing, where the drive shaft axially rotates about a drive shaft axis parallel to the tool exchange axis;

a cylindrical member coaxially fixed to the drive shaft and having a removal cam groove formed on the outer surface of the cylindrical member; and a removal pivot member fixed at one end, attached at another end to the hollow shaft, and engaging the removal groove; wherein as the cylindrical member rotates, the removal cam groove acts on the removal pivot member such that the end of the removal pivot member attached to the hollow shaft is moved in first and second directions along the tool exchange axis.

26. The tool exchange device of claim 20, further comprising:

a drive shaft mounted on the housing, where the drive shaft axially rotates about a drive shaft axis parallel to the tool exchange axis;

a cylindrical member coaxially mounted on the drive shaft; and a shaft gear mounted on the central shaft; wherein the rotating member is a segment gear mounted adjacent to a first end of the cylindrical member and the central shaft, where a first end of the rotating member is attached to the segment gear such that the rotating member rotates the segment gear about a segment gear axis parallel to the drive axis when a second end of the rotating member is rotated about the segment gear axis;

the shaft gear meshes with the segment gear such that the shaft gear rotates the central shaft about the tool exchange axis in an opposite direction to the rotation of the segment gear;

a rotation cam groove is formed on an end surface on the first end of the cylindrical member; and the second end of the rotating member engages the rotation groove such that, when the drive shaft rotates about the drive axis, the rotation groove acts on the second end of the rotating member to rotate the rotating member in the second direction about the segment gear axis and then in the first direction about the segment gear axis.

27. The tool exchange device of claim 26, in which the rotation cam groove comprises:

a open portion formed from an arc having a first radius as measured from the drive shaft axis;

a closed portion formed from an arc having a second radius as measured from the drive shaft axis that is longer than the first radius;

an opening portion connected to the open portion and the closed portion such that the distance from the opening portion of the drive shaft axis increases from the point where the opening portion is connected to the open portion to the point where the opening portion is connected to the closed portion; and a closing portion connected to the open portion and the closed portion such that the distance from the opening portion to the drive shaft axis decreases from the point where the opening portion is connected to the open portion to the point where the opening portion is connected to the closed portion; wherein as the drive shaft turns, the rotation cam contacts the second end of the rotating member such that the second end of the rotating member does not rotate about the segment gear axis when the second end of the rotating member contacts the open and closed portions of the rotation cam groove, the second end of the rotating member rotates in the second direction about the segment gear axis when the second end of the rotating member contacts the closing portion of the rotation cam groove, and the second end of the rotating member rotates in the direct direction about the segment gear axis when the second end of the rotating member contacts the opening portion of the rotation cam groove.

28. The tool exchange device of claim 1, in which the opening means comprises:

a disk rotatable about the tool exchange axis and having cam portions formed thereon, where each cam portion has an abutting surface extending substantially radially from the tool exchange axis; and a following projection extending from each of said first and second grasping means that abuts the abutting surface of one of the cam portions of the disk, where the abutting surface contacts and moves the following projection when the disk rotates in a first grasping direction about the tool exchange axis.

29. The tool exchange device of claim 1, in which:

the central shaft is mounted along the tool exchange axis such that the central shaft axially rotates about the tool exchange axis independently of the tool exchange arm;

the opening means comprises grasp cam means that rotate about the tool exchange axis;

a hole is formed on the grasp cam means along the tool exchange axis; and an engaging end of the central shaft engages the hole in the grasp cam means to rotate the grasp cam means in first and second grasping directions about the tool exchange axis.

30. The tool exchange device of claim 10, in which:

the grasp cam means is a disk rotatable about the tool exchange axis and having cam portions formed thereon, where each cam portion has an abutting surface extending substantially radially from the tool exchange axis; and the cam follower member is a following projection extending from each of said first and second grasping means that abuts the abutting surface of one of the cam portions of the disk, where the abutting surface contacts and moves the following projection when the disk rotates in the first grasping direction about the tool exchange axis.

31. The tool exchange device of claim 10, in which:

the central shaft is mounted along the tool exchange axis such that the central shaft axially rotates about the tool exchange axis independently of the tool exchange arm;

a hole is formed on the grasp cam means along the tool exchange axis; and an engaging end of the central shaft engages the hole and the grasp cam means to rotate the grasp cam means in the first and second grasping directions about the tool exchange axis.

32. The tool exchange arm of claim 17, further comprising a central shaft mounted along the tool exchange axis such that the central shaft axially rotates about the tool exchange axis independently of the tool exchange arm body; wherein the grasp cam means rotates about the tool exchange axis, a hole is formed on the grasp cam means along the tool exchange axis, and an engaging end of the central shaft engages the hole in the grasp cam means to rotate the grasp cam means in the first and second grasping directions about the tool exchange axis.

33. The driving mechanism of claim 20, in which:

the cam actuator is a disk rotatable about the tool exchange axis and having cam portions formed thereon, where each cam portion has an abutting surface extending substantially radially from the tool exchange axis; and the cam follower is a following projection extending from the grasping means that abuts the abutting surface of one of the cam portions of the disk, where the abutting surface contacts and moves the following projection when the disk rotates in a first grasping direction about the tool exchange axis.

34. The tool exchange device of claim 1, further comprising a rotating member rotatably attached to the spindle head and coupling the rotation means to the central shaft; wherein a first end of the hollow shaft is supported by the rotating member, and a second end of the hollow shaft is connected to the tool exchange arm and is supported by the spindle head.

35. The tool exchange device of claim 10, further comprising a rotating member rotatably attached to the spindle head for rotating the central shaft; wherein a first end of the hollow shaft is supported by the rotating member, and a second end of the hollow shaft is connected to the tool exchange arm and is supported by the spindle head.

36. The driving mechanism of claim 20, wherein a first end of the hollow shaft is supported by the rotating member, and a second end of the hollow shaft is connected to the tool exchange arm and is supported by the housing.

* * * * *